United States Patent [19]

Zukerman et al.

[11] Patent Number: 4,764,390

[45] Date of Patent: Aug. 16, 1988

[54] PROCESS FOR MAKING MICROWAVABLE SHAPED RICE PRODUCTS

[76] Inventors: Harold W. Zukerman; Rachel B. Zukerman, both of 4125 Yorkshire, Northbrook, Ill. 60062

[21] Appl. No.: 857,495

[22] Filed: Apr. 30, 1986

[51] Int. Cl.$^4$ ............................ A23L 1/01; A23P 1/00
[52] U.S. Cl. .................................... 426/438; 426/241; 426/512; 426/524; 426/618
[58] Field of Search ............... 426/508, 509, 618, 512, 426/524, 438, 241

[56] References Cited

U.S. PATENT DOCUMENTS

| | | | |
|---|---|---|---|
| 3,711,295 | 1/1973 | Zukerman | 426/618 |
| 3,961,087 | 6/1976 | Zukerman | 426/618 |
| 4,338,344 | 7/1982 | Brooks et al. | 426/508 |

*Primary Examiner*—George Yeung
*Attorney, Agent, or Firm*—Irving Faber

[57] ABSTRACT

A microwavable shaped rice product made with limited amounts of water, producing cooked rice grains with centers that are not fully hydrated. These shaped rice products are held in frozen storage and prior to serving they are reheated in a microwave oven. When the shaped rice products are microwave reheated from the frozen state, a portion of their water that was originally bound with the rice grain structure, is released. During this microwave reheating, this released water becomes very hot, both cooking and being absorbed by the not fully hydrated rice grain centers. When microwavable shaped rice products are later served, they have a crust and their overall inner texture is soft and firm, but not soggy.

14 Claims, 3 Drawing Sheets

PROCESS FOR MAKING MICROWAVABLE SHAPED RICE PRODUCTS

BACKGROUND OF THE INVENTION

There are several products such as rice cakes and granola bars, that consist of dry, puffed rice, and/or dry, puffed cereals. Syrup binders hold together the dry, puffed rice and/or dry puffed cereals in granola bars. Other methods are used to hold together other dry, puffed cereal products. However, these dry, puffed cereal products all have a very low moisture content, and are neither frozen, stored frozen, or reheated before the consumer eats the product.

The procedures for making frozen shaped rice products are set forth in U.S. Pat. No. 3,711,295. The techniques for preparing a frozen cooked rice product that has a portion of its amylose and amylopectin modified are discussed in U.S. Pat. No. 3,961,087.

Cooked rice grains are soft and fragile, and can easily become pasty and gummy during the cooking and shaping process. Some high shear shaping machinery is designed to create a high shear action and will always produce shaped rice products with mashed and sheared rice grains that have an excessively pasty and gummy texture. Some low shear shaping machinery is designed with features that are not as destructive to the soft, cooked rice grains. When most low shear shaping machines are operated at very slow speeds, they make shaped rice products that have a satisfactory texture. However, when some low shear shaping machines are run at a faster rate, shearing, mashing, and rice grain destruction occurs, and the shaped rice products' texture become excessively pasty and gummy.

Currently, frozen shaped rice products, which are usually reheated by oven baking or fat frying, become very soggy and are judged unacceptable when reheated with a microwave oven. My invention incorporates procedures and equipment to make microwavable frozen shaped rice and/or other grain products that have a surface crust and interiors that are not excessively pasty and gummy even though they are produced at relatively high production rates.

BRIEF SUMMARY OF THE INVENTION

It is the object of the present invention to provide a shaped rice product that utilizes broken or whole grain rice that has a surface crust and an interior of soft rice grains that are not excessively pasty and gummy.

It is another object of the present invention to provide a microwavable shaped rice product that utilizes broken or whole grain rice that does not become soggy when it is reheated from the frozen state by a microwave oven.

It is another object of the present invention to provide a mixed grain shaped product that comprises broken or whole grain rice with other cereal grains, starch or cereal components, such as wheat, buckwheat, sorghum, potato, millet, corn, barley, triticale, cassava, oats, or rye having a surface crust and a soft interior [wherein that contains] the other grains dispersed together with rice grains.

It is another object of the present invention to provide a microwavable shaped rice product having identifiable, natural food pieces such as mushrooms, shrimp, vegetables, fruits, nuts, sesame seeds, onions, apples, raisins, diced poultry or ham, dispersed together with the soft, cooked rice grains or mixed grains.

It is another object of the present invention to provide an oriental-flavored microwavable shaped rice product having short or medium grain rice that does not become soggy when reheated from the frozen state by microwave ovens.

DETAILED DESCRIPTION OF THE PREFERRED EMBODIMENT

Figure 1:
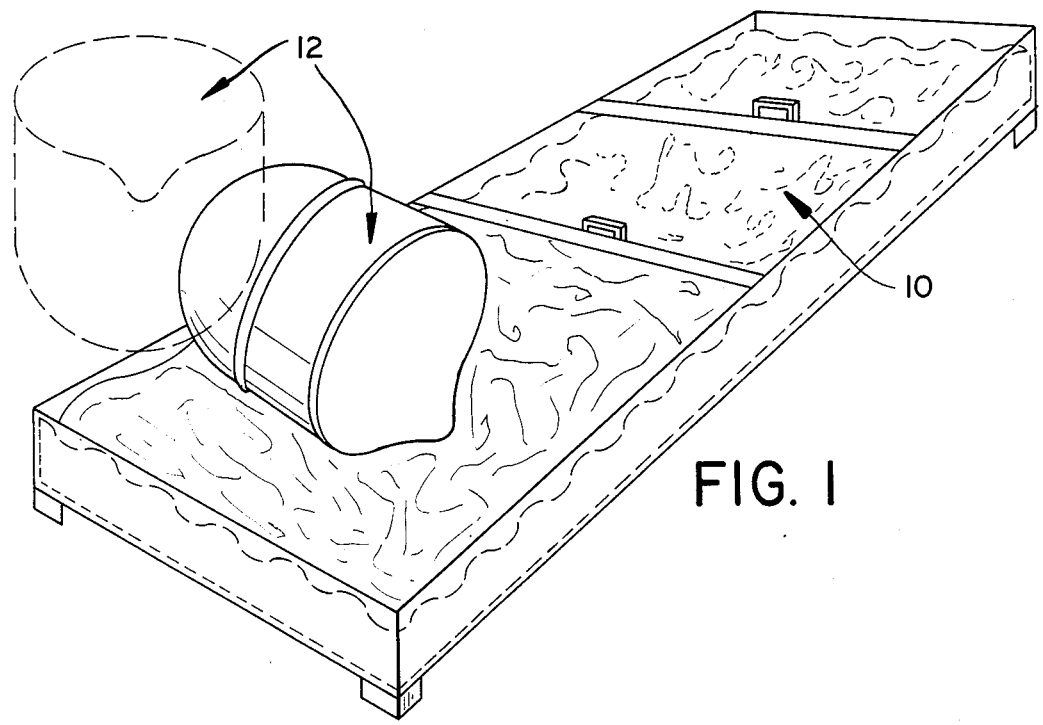
FIG. 1 is a perspective view of a covered transfer-conveyor suitable for receiving partially cooked rice from the cooking kettles.

The present invention relates to a shaped rice and/or grain food product and more particularly, it is directed to a shaped rice and/or grain food product suitable for cooking in a microwave oven or the like. To more simply describe my invention, I refer to it as a shaped rice product. However, it is understood that it may consist of rice or rice and other grains as more fully described hereinafter.

Microwavable shaped rice and/or grain food products are generally prepared in a three step procedure: (1) Cooking, (2) Shape Formation; and (3) Crust Formation.

The first step is the rice-cooking process wherein my preferred embodiment, one hundred pounds of dry, whole or broken grain rice, is cooked in approximately two hundred pounds of 170° F.–212° F. water. The cooking takes place in a kettle having non-shear scrapers suitable for handling the aforesaid quantities of rice and water. Cooking kettles for this purpose are well-known in the art and are readily available in the market place and, therefore, not illustrated in the drawings. A pre-blend of one pound glycerol monostearate and one-quarter pound of vegetable oil may be mixed with the cooked rice. The oil and starch complexing materials prevent the rice grains from sticking together in the early phase of rice cooking. They also complex the amylose and amylopectin starch during cooking, and finally, by providing some additional lubrication to the rice, there is less mechanical damage during the shaping of the units. This results in significantly less damaged rice grains in the shaped rice products interiors.

Other starch complexing agents that can be used include: glyceryl monostearate, glyceryl monopalmitate, glycerol monolaurate, glyceryl monomyristate, glyceryl monoarachidate, glyceryl monooleate, glyceryl monolinoleate, calcium stearoyl-2-lactylate, sodium stearoyl-2-lactylate, polyoxyethylene monostearate, sodium stearoyl-fumate, sucrose fatty acids, and succinylated monoglycerides.

The glycerol monostearate-vegetable oil-water mixture is agitated in the hot liquid before the dry rice is added, and is continuously agitated during and after the dry rice is added. Non-shear scraper mixers (not illustrated) in the kettle agitate the rice at a slower rate as the rice absorbs the hot water and becomes softer in texture. Finally, the water and oil dispersion becomes absorbed into the rice grain structure.

The second step of the rice cooking process is the addition of the flavor. The flavor is added to the cooking kettle by means well known in the art and blended together with the now hot, soft, partially cooked rice grains. There are three categories of flavors:

1. Herb and Spice Flavor Blend. This category consists of soluble and dispersible ingredients such as salt, butter, dextrose, monosodium glutamate, soy sauce, honey, sodium acid pyrophosphate, herbs, and spices.

2. Mixed Cereal Flavor Blend. Mixed cereals provide both an improved taste and also an improved texture. This is especially true when they are also blended together with natural food pieces such as raisins and apples. Grains or parts of grains such as wheat, soy, millet, corn, oats, barley, triticale, cassava, buckwheat, and rye should be cooked together with the rice grains in the cooking kettle. Precooked or toasted grains or parts of grains can be added as a flavor and blended together with the soft, partially cooked rice grains.

3. Natural Food Pieces Flavor Blend. Natural food pieces such as mushrooms, shrimp, vegetables, fruits, nuts, sesame seeds, onions, apples, raisins, and diced poultry or ham can be dispersed together with the soft, cooked rice grains.

Two ingredients in the flavor blend, dextrose and sodium acid pyrophosphate, are used to help control the golden brown surface color of shaped rice products. Lighter surface colors are obtained when less dextrose is used. Dark surface colors are obtained when more dextrose is used. Sodium acid pyrophosphate is in the product for two reasons:

1. It improves the texture of the shaped rice products, and

2. It also chelates the heavy metals in the rice. If the heavy metals are not chelated, they will cause the surface of the shaped rice products to become dark in color.

The added flavor also contains about 1% butter, margarine, or vegetable oil for both lubrication and improved flavor. The added butter, margarine, and/or oil provides lubrication which reduces the mechanical damage during the shaping operation which in turn yields rice shapes with more undamaged soft rice grains.

The added flavor could also contain water. The amount of water added to the cooking kettle for each 100 lbs. of dry, raw rice is influenced by how the consumer is later expected to reheat the shaped rice product from frozen storage:

(A) Rice grains for microwavable shaped rice products are cooked with a total of about 100 lbs. to 350 lbs. of water per 100 lbs. of dry rice.

(B) Rice grains for shaped rice products are cooked with a total of about 100 to 400 lbs. of water per 100 lbs. of dry rice when one of the following three reheating techniques is used: (1) fat frying, (2) oven baking, or (3) microwave—but with the use of special microwave absorbing materials that become hot from the microwaves and then bakes the shaped rice products in the microwave oven.

Gums, well known in the art are good water binders and may be used to soak up the released water that becomes available when the shaped rice products are reheated from frozen storage by a microwave oven. However, it is redundant to add the gums because rice grains prepared for microwavable shaped rice products soak up and bind the water that becomes released when the shaped rice products are reheated.

Figure 2:
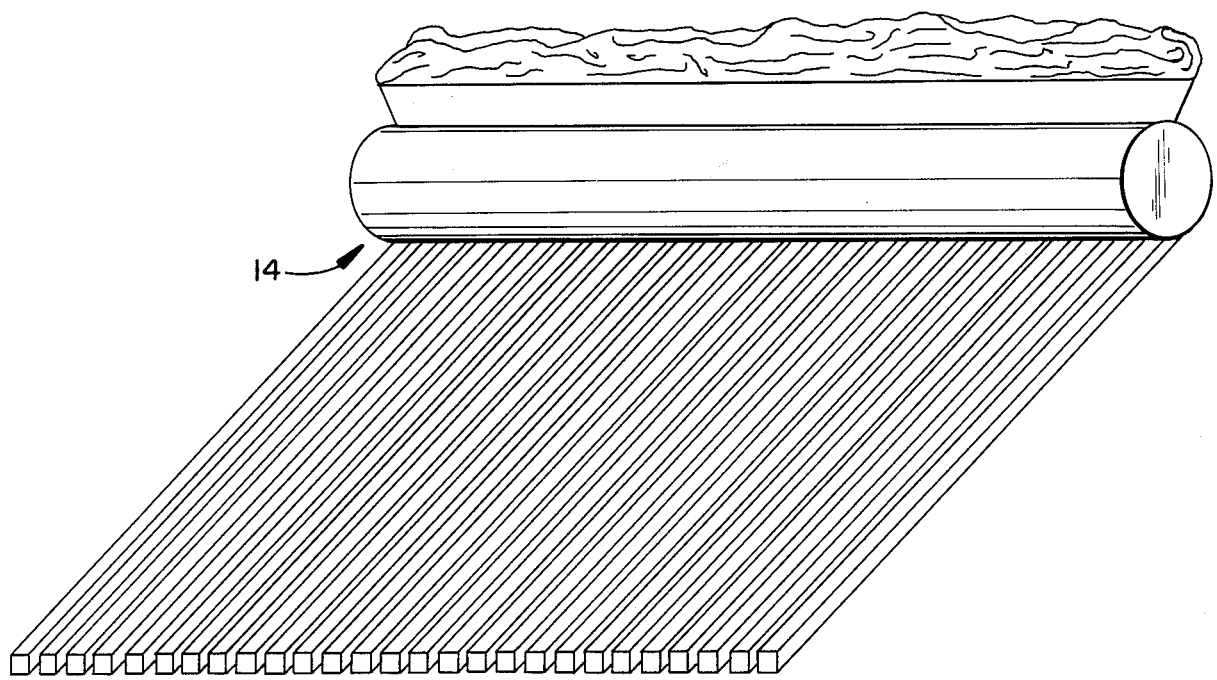
FIG. 2 is a graphic view of a low shear roll extrusion device.
Figure 3:
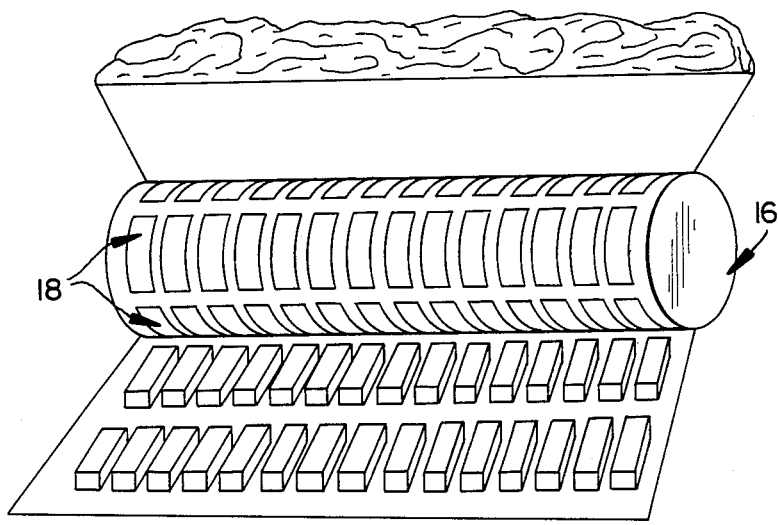
FIG. 3 is a perspective view of a shape forming device having molds to form the shaped rice units.
Figure 4A:
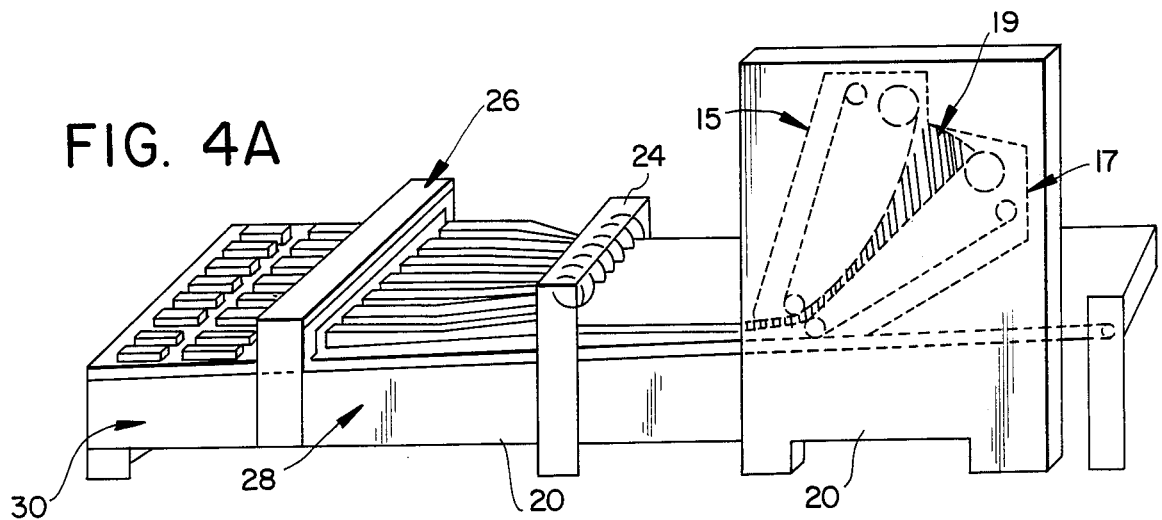
FIGS. 4A and 4B illustrate a device for forming a sheet of joined cooked rice grains and then cutting the sheet into shaped rice units.
Figure 4B:
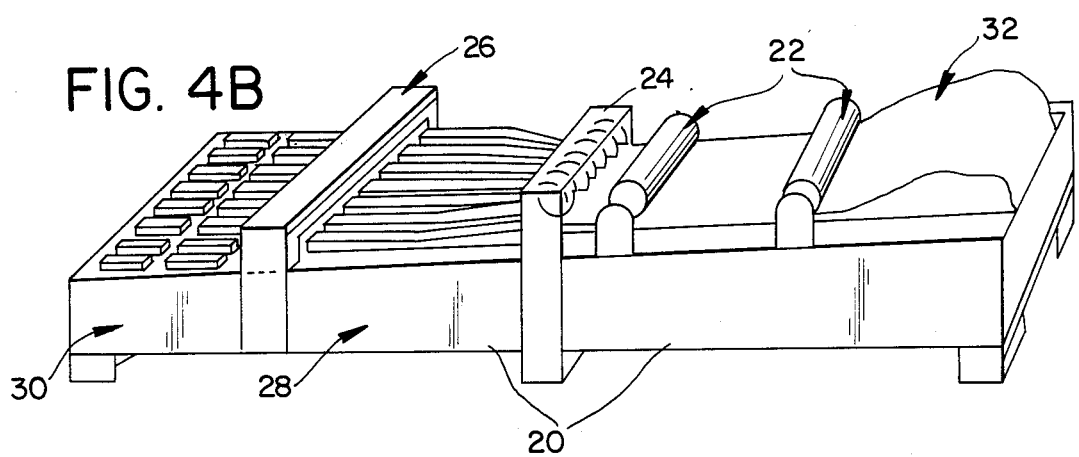

The third step of the rice cooking process takes place in a covered transfer-conveyor 10 (illustrated in FIG. 1). When the rice is moved from a cooking kettle 12 to the transfer-conveyor 10, it is still fluid. The rice at this time is only partially cooked. The rice grain centers are not fully hydrated and they can even have small sections that are hard and dry while their surface is soft. The conveyor cover is then closed, and the rice continues to cook in an enclosed environment at temperatures above 160° F. While the rice is cooking, the transfer-conveyor moves the rice very slowly from the cooking kettle 12 to a shaping device. FIG. 2 illustrates one type of shaping device. FIG. 3 illustrates a second type of shaping device 16, and FIGS. 4A and 4B illustrate a third type of shaping device, 20. The rice is cooked in the transfer-conveyor without agitation that could shear or mash the soft rice grain texture. Covered transfer-conveyors are well known in the art and readily available in the market place.

By the time the cooked rice for the microwavable shaped rice products reaches the shaping equipment 15 to 30 minutes later, the surface of the rice grains still remain soft and the rice grain centers have absorbed some of the surface moisture. However, the rice grain centers are still only partially hydrated, i.e., they are either soft and partially hydrated, or a very small part of the rice grain center is still hard and virtually uncooked.

In my preferred embodiment, the rice cooking process cooks rice for microwavable shaped rice products so that the rice grains do not get fully cooked and fully hydrated. This way they have extra capacity to soak up additional water when they are later reheated with microwave energy. This additional water becomes available from the thawed rice starch granules that are broken during freezing, frozen storage, and freeze/thaw abuse and from some retrograded rice starch granules. Microwave oven reheating does not evaporate much water. Microwave reheating works on the principle that during the microwave reheating process, the released water becomes very hot, both cooking and being absorbed by the not fully hydrated rice grain centers. Therefore, when microwavable shaped rice products are served, all the extra moisture has been reabsorbed by the rice grains and the inner texture is soft and firm, but not soggy.

Rice shapes can be made from the cooked rice by one of the following low shear, multiple-deposit, shaping devices well known in the art and readily available in the market.

(a) A roll extrusion device 14 having 3 to 200 parallel rows of rice shapes, is graphically illustrated in FIG. 2.

(b) A form shaping device 16 having molds 18 to form the shapes is illustrated in FIG. 3.

(c) A form shaping device 20 in FIGS. 4A and 4B illustrates the forming of a sheet of joined cooked rice grains and then cutting the sheet into shaped rice units.

FIG. 2 shows the roll extrusion device 14 that feeds the cooked rice between two rolls and extrudes between 3 and 200 parallel ribbons of joined, cooked rice grains. This technique is used to produce rectangular, cylindrical, square, oval, and other special shapes, not illustrated. With this shaping device, more desirable rice grain textures are achieved when the maximum number of die holes, not illustrated, are used. Also, it is preferable to use at least 4 inch diameter rolls (larger diameter rolls are even better because they reduce churning during the rice feeding). Finally, it is also preferred to use rice that is hot and freshly prepared.

Figure 5:
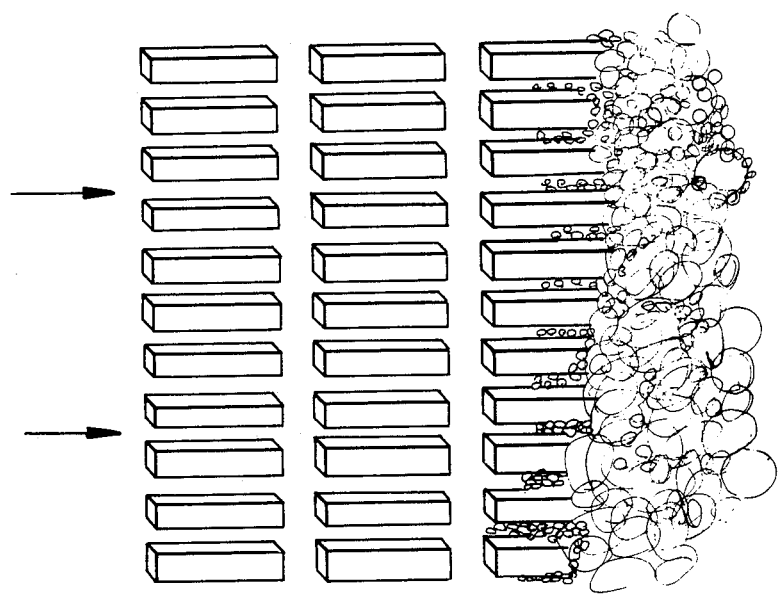
FIG. 5 illustrates the separated units of the rice shapes before they are submerged in the hot fat.

A cutter such as a rotary or a guillotine cutter can be used to cut the 3 to 200 parallel rows of cooked rice into units that are 2, 2½, or 3 inches long or any other desirable length. Once the units are cut, they then have to be separated as illustrated in FIG. 5 so that there is a space between them. If the units are not properly spaced, they might stick to one another when they are fat fried.

FIG. 3 shows the shape forming device 16 having two molds 18. This device consists of two parallel horizontal cylinders that rotate in opposite directions. One roll is smooth: the other has several side by side designs of the product shape engraved in the cylinder. FIG. 3 illustrates how the soft cooked rice is compressed into the molds and the shaped rice units containing the cooked rice grains are then released onto a conveyor belt. The pattern illustrated in FIG. 3 shows the shaped rice products already properly spaced for the crust forming operation.

FIGS. 4A and 4B show a shape forming device 20 using the technique of cutting a sheet of rice grains into shapes.

The cooked rice from the transfer conveyor 10 illustrated in FIG. 1 can be reduced to a sheet which in turn can be cut into shapes. There are several ways to form a sheet of cooked rice grains. One way is illustrated in FIG. 4A which shows two conveyors converging: 15 is the top conveyor; 17 is the bottom conveyor: and 19 is the cooked rice grains. The rice 19 is compressed between the two conveyors 15 and 17 so that it becomes a sheet of joined rice grains by the time it leaves the two conveyors.

FIG. 4B shows a second technique: a shape forming device that forms rice sheets by compressing soft cooked rice grains. This second technique is accomplished by systematically reducing the height of a bed of cooked rice grains with one, two, or more compression rolls or plates 22. This sheet is then cut into shaped rice units.

The form-shaping device 20 illustrated in FIG. 4B can also be used to make a shpaed rice product that has a more concentrated flavor on its top side. This is accomplished by layering on the top side of the sheet of joined cooked rice grains 32 (between the two compressions rolls 22) either one or all of the following flavor blends:

(a) a herb and spice flavor blend,
(b) a mixed cereal flavor blend,
(c) a natural food pieces flavor blend,
(d) a cooked rice with a different flavor.

The last compression roll 22 compresses the flavor layer into the sheet of joined cooked rice grains so that it becomes a multilayered sheet.

Rotary cutters 24 (3 to 150 per machine) cut the sheet of compressed rice grains into strips. A guillotine or rotary cutter 26 cuts the strips into 2-inch to 3-inch long units. The rice shapes have to be separated as illustrated in FIG. 5. This is accomplished by using a belt spreader 28 to create a ¼ inch space between the rows of compressed rice grains. A space between the lengths of the units is created when the rice units are transferred from one conveyor to a second conveyor 30 moving at a slightly faster speed. If the units are not properly separated, they might stick to one another when they are fat fried.

Shaped rice products can be made in many different shapes and flavors. Some can be made to be reheated from frozen storage by microwave energy while others can be made to be reheated from frozen storage by (a) oven baking, (b) fat frying or (c) baking in a microwave oven with a browning element or hot microwave absorbing material. The following three embodiments illustrate how different flavors, cereal mixtures, and rice varieties can be appropriately formulated to produce different products.

EXAMPLE 1

MICROWAVABLE ONION-BUTTER SHAPED RICE PRODUCTS

Figure 6:
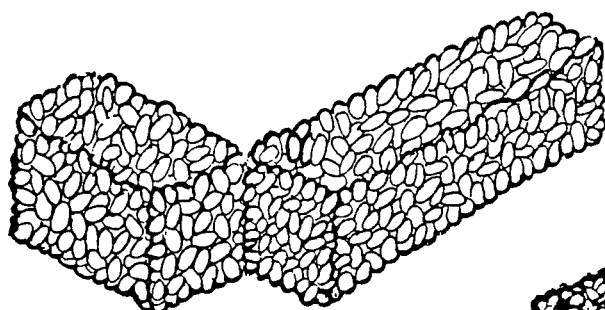
FIG. 6 illustrates cooked rice grains in a rectangular shape before the surface crust is formed. The rectangular shape is illustrated in two parts to show both the interior and surface textures.

This example lists the formula for an onion-butter flavored cooked rice. The cooked rice grains are first formed into a given shape. FIG. 6 illustrates cooked rice grains in a rectangular shape before the surface crust is formed. The rectangular shape is illustrated in two parts to show the interior and surface textures. Then, the surface crust is developed and the units are frozen and stored frozen.

| WEIGHT INGREDIENTS | RANGE (PERCENT) | (PERCENT) |
|---|---|---|
| Water | 57.00 | 45–60 |
| Medium grain rice | 38.00 | 20–50 |
| Salt | 1.20 | 0.2–2 |
| Butter | 1.20 | 0.5–5 |
| Dextrose | 0.95 | 0.5–1 |
| Dry minced onion | 0.70 | 0.2–5 |
| Monosodium glutamate | 0.40 | 0.2–1 |
| Distilled glyceryl monostearate | 0.33 | 0.1–1 |
| Sodium acid pyrophosphate | 0.07 | 0.01–.5 |
| Vegetable oil | 0.15 | 0.1–5 |
| | 100.00 | |

EXAMPLE 2

SESAME/SOY-ORIENTAL FLAVORED SHAPED RICE PRODUCTS

This example lists the formula for a sesame/soy flavored cooked rice. The cooked rice grains are first formed into a given shape. FIG. 6 illustrates cooked rice grains in a rectangular shape before the crust is formed. The rectangular shape is illustrated in two parts to show both the interior and surface textures. Then, the surface crust is developed, and the units are frozen and stored. Short and/or medium grain rice was selected for the oriental style shape rice product because of its distinctive taste and texture and its excellent freeze/thaw resistant properties.

| WEIGHT INGREDIENTS | RANGE (PERCENT) | (PERCENT) |
| --- | --- | --- |
| Water | 68.00 | 50–75 |
| Medium or short grain rice | 25.00 | 20–45 |
| Soy sauce | 3.00 | 0.5–5 |
| Sesame oil | 1.00 | 0.5–5 |
| Sugar | 0.85 | 0.2–2 |
| Salt | 0.80 | 0.5–1.5 |
| Dextrose | 0.62 | 0.2–1 |
| Glycerol Monostearate | 0.25 | 0.1–1 |
| Minced onion | 0.40 | 0.1–4 |
| Disodium Pyrophosphate | 0.05 | 0.01–0.5 |
| Minced garlic | 0.02 | 0.01–0.3 |
|  | 100.00 |  |

EXAMPLE 3

SHAPED RICE PRODUCT WITH MIXED GRAINS AND ALSO WITH NATURAL FOOD PIECES

Figure 7:
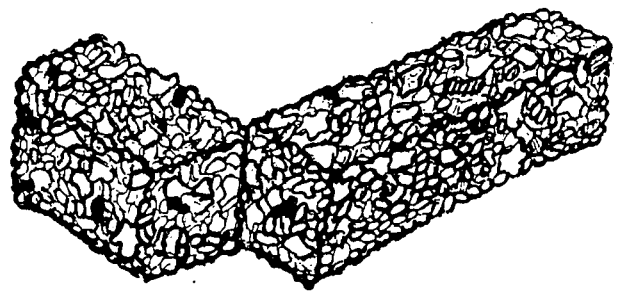
FIG. 7 illustrates mixed grains with natural food pieces in a rectangular shape before the surface crust is formed. The rectangular shape is illustrated in two parts to show both the interior and surface textures.

This example lists the formula for a cooked rice flavored with other mixed grains and also with natural food pieces. The cooked rice blend is first formed into a given shape. FIG. 7 illustrates a rectangular shape with the cooked rice grains dispersed together with the other cereal grains and also with the natural food pieces before the surface crust is formed. The rectangular shape is illustrated in two parts to show the interior and surface textures. Then, the surface crust is developed and the units are frozen and stored frozen.

Figure 8:
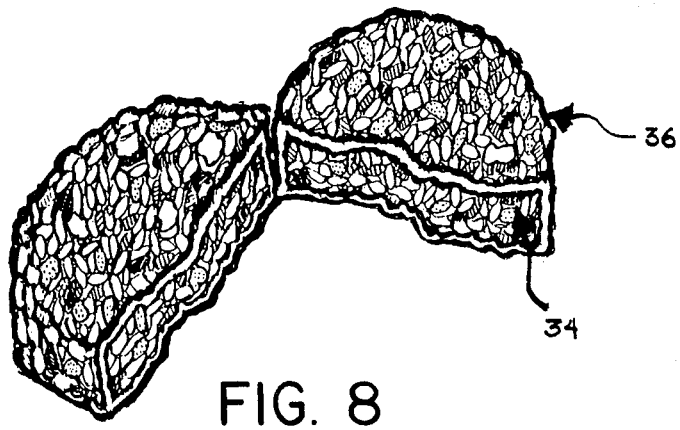
FIG. 8 illustrates a microwavable circular shaped rice product made from mixed grains and natural food pieces. It is depicted after its crust has been developed. This product is made so that the consumer can reheat the frozen product within a minute or two by microwave energy. The circular shape is illustrated in two parts to show both the interior texture and the surface crust.

FIG. 8 illustrates a microwavable circular shaped rice product made from mixed grains and natural food pieces. It is depicted after its crust has been developed. The circular shape is illustrated in two parts to show both the interior 34 texture and the surface crust 36. This product is made so that the consumer can reheat the frozen product within a minute or two by microwave energy.

| WEIGHT INGREDIENTS | RANGE (PERCENT) | (PERCENT) |
| --- | --- | --- |
| Water | 68.00 | 50–75 |
| Broken grain or whole grain long grain white rice | 10.00 | 5–25 |
| Medium grain brown rice | 10.00 | 5–25 |
| Steel cut oats | 2.00 | 1–10 |
| Pearl barley | 2.00 | 1–5 |
| Corn oil | 1.50 | 0.1–5 |
| Diced apples | 1.50 | 0.5–5 |
| Black raisins | 1.50 | 0.5–5 |
| Honey | 1.00 | 0.5–2 |
| Salt | 1.00 | 0.2–3 |
|  | 100.00 |  |

When the cooked rice product has been formed and shaped, it is conveyed to a deep fat fryer (not illustrated) by a suitable conveyor belt (illustrated in FIG. 5.) There are three steps to the frying operation:
(a) precooking the surface so that the units don't stick together.
(b) crust formation, and
(c) draining the excess fat before the units are cooled and frozen.

FIG. 5 is an illustration of the rice shapes on a mesh belt conveyor. There is a space between the units. the first row of rice units is just about to move into the hot fat. It is not yet submerged, however. The hot bubbling fat is creeping up the mesh belt conveyor and is already frying their bottoms and sides. This pre-frying is helpful because it starts the crust formation process while the rice units are laying straight. This pre-frying operation also seals the shaped rice products' surfaces which makes them less likely to become stuck to one another when they become submerged or are allowed to float in the hot fat. A crust is formed by fat frying the units for about 40 to 60 seconds at 375° F. –410° F. Longer frying times may be required for microwavable shaped rice products because they sometimes need a thicker crust.

During the fat frying operation, approximately 10%–25% of the shaped rice products' moisture boils off while the submerged units pick up approximately 5%–20% of the hot cooking fat. Since the cooking fat has now become one of the major ingredients of the product, it is important to assure that its quality is properly controlled. Finally, the excess fat is drained from the units, by means well-known in the art.

A second means to form a crust on the surface of shaped rice products is with a hot air oven at oven temperatures of about 550° F. for about five to ten minutes. Crusts developed by oven baking are useful for shaped rice products that are merchandised as low calorie or controlled calorie foods.

The development of a crust is important because without the surface crust, the thawed shaped rice products fall apart or become stuck together.

The shaped rice product is conveyed from the fryer to a packaging device, not shown but well-known in the art and readily available in the market. The packages of shaped rice product are preserved in two ways:

(1) Freezing and storing the product frozen. The shaped rice product should be frozen rapidly because a better texture is achieved when small ice crystals are formed rather than when large crystals are formed. Large ice crystals are more prone to break rice starch granules and create more free, unbound fluid when the shaped rice products are reheated from frozen storage.

(2) Shaped rice products treated with an antimycotic agent such as 0.10% to 0.4% sorbic acid, sodium benzoate or sodium sorbate can be manufactured frozen and held in frozen storage until sold. The product can then be refrigerated for up to 10 days.

It is to be understood that the above described process and the above examples are simply illustrative of the application of principles of the invention and many other modifications may be made without departing from the spirit and scope of the invention.

The embodiments of the invention in which an exclusive property or privilege is claimed are defined as follows.

I claim:

1. A process for making a microwavable shaped rice product, said process comprising the steps of:
   (a) partially cooking 100 lbs. of raw, hard, whole or broken grain dry rice with 100 lbs. to 350 lbs. of water at 170° F. to 212° F.;
   (b) combining one or more of a plurality of flavors with the partially cooked rice;
   (c) removing the partially cooked rice from the hot water prior to the center of the rice becoming fully cooked;
   (d) conveying the partially cooked rice on a horizontal belt through an enclosed environment at a temperature above 160° F. whereby the rice and flavor continue to cook, leaving the center of the rice grains not fully cooked and not fully hydrated;

(e) shaping the cooked rice with low-shear, multiple-deposit, multiple-extrusion and multiple-cutting devices to form a shaped rice product;

(f) forming a crust on the shaped rice product surface by floating the shaped rice product in a fat fryer; the floating of the product being related to its density; and (g) freezing the rice product.

2. The process set forth in claim 1 wherein the rice is cooked in the presence of a starch complexing agent comprising glycerol monostearate, in a ratio of starch complexing agent to dry rice is about 1 lb. of complexing agent to about 100 lbs. of dry rice.

3. The process set forth in claim 2 wherein the shaping step comprises compressing the cooked rice grains by means of a two-roll extrusion device that forms from 3 to 200 or more continuous rope-like shapes containing the soft rice grains that are joined to each other, said rope-like shapes being conveyed to a guillotine cutter for the purpose of simultaneously cutting the said 3 to 200 ropes of cooked rice into 2-inch to 4-inch long units.

4. The process set forth in claim 3 wherein the shaping step further comprises compressing the cooked rice grains simultaneously into 3 to 200 molds of one of a plurality of rice shapes; said rice shapes being simultaneously deposited across the width of the conveyor having a minimum of a 1/16 inch shape between the units.

5. The process set forth in claim 4 wherein the rice is cooked with a chelating agent comprising sodium acid pyrophosphate.

6. The process set forth in claim 5 wherein cereal grains, starch and cereal components are combined with the whole or broken grain rice.

7. The process set forth in claim 6 wherein the shaped rice product is treated with 0.10 to 0.4% sodium bensoate, sorbic acid or sodium sorbate.

8. The process set forth in claim 7 wherein natural food pieces are dispersed together with the cooked rice grains.

9. The process set forth in claim 8 wherein said starch complexing agent is selected from the group consisting of glyceryl monopalmitate, glyceryl monolaurate, glyceryl monomyristate, glyceryl monostearate, glyceryl monoarachidate, glyceryl monoleate, glyceryl monolinoleate, calcium stearoyl-2-lactylate, sodium stearoyl-2-lactylate, polyoxyethylene monostearate, sodium stearoyl fumarate, and succinylated monoglycerides.

10. The process set forth in claim 1 wherein a herb and spice flavor blend is layered on the top side of the rice grains having centers not fully cooked and not fully hydrated prior to the crust being formed.

11. The process set forth in claim 1 wherein a mixed cereal flavor blend is layered on the top side of the rice grains having centers not fully cooked and not fully hydrated prior to the crust being formed.

12. The process set forth in claim 1 wherein natural food pieces flavor blend is layered on the top side of the rice grains having centers not fully cooked and not fully hydrated prior to the crust being formed.

13. The process set forth in claim 1 wherein a cooked rice with a different flavor is layered on top of the rice grains having centers not fully cooked and not fully hydrated prior to the crust being formed.

14. The process set forth in claim 2 wherein natural food pieces are combined with the rice grains having centers not fully cooked and not fully hydrated.

* * * * *